(12) United States Patent
Guner et al.

(10) Patent No.: US 11,635,542 B2
(45) Date of Patent: Apr. 25, 2023

(54) METHOD FOR IMPROVING THE ACCURACY OF MUD ANGLE MEASUREMENTS IN BOREHOLE IMAGERS

(71) Applicant: Halliburton Energy Services, Inc., Houston, TX (US)

(72) Inventors: Baris Guner, Houston, TX (US); Luis Emilio San Martin, Albuquerque, NM (US)

(73) Assignee: Halliburton Energy Services, Inc., Houston, TX (US)

( * ) Notice: Subject to any disclaimer, the term of this patent is extended or adjusted under 35 U.S.C. 154(b) by 387 days.

(21) Appl. No.: 16/603,642

(22) PCT Filed: Nov. 13, 2018

(86) PCT No.: PCT/US2018/060722
§ 371 (c)(1),
(2) Date: Oct. 8, 2019

(87) PCT Pub. No.: WO2020/101653
PCT Pub. Date: May 22, 2020

(65) Prior Publication Data
US 2021/0048553 A1 Feb. 18, 2021

(51) Int. Cl.
*G01V 3/38* (2006.01)
*E21B 47/002* (2012.01)
(Continued)

(52) U.S. Cl.
CPC ............ *G01V 3/38* (2013.01); *E21B 47/0025* (2020.05); *G01V 3/26* (2013.01); *E21B 49/08* (2013.01)

(58) Field of Classification Search
CPC ........ G01V 3/38; G01V 3/26; E21B 47/0025; E21B 49/08
See application file for complete search history.

(56) References Cited

U.S. PATENT DOCUMENTS 9,921,337 B2 * 3/2018 Bloemenkamp ....... G01V 13/00
2013/0027043 A1 1/2013 Li et al.
(Continued)

FOREIGN PATENT DOCUMENTS

| EP | 2749910 | 7/2014 |
|---|---|---|
| WO | 2019088988 | 5/2019 |
| WO | 2019088998 | 5/2019 |

OTHER PUBLICATIONS

Chen et al., Inversion-Based Workflow for Quantitative Interpretation of the New-Generation Oil-Based-Mud Resistivity Imager, Dec. 2014, Petrophysics, vol. 55, No. 6, pp. 554-571 (Year: 2014).*
(Continued)

*Primary Examiner* — Toan M Le
(74) *Attorney, Agent, or Firm* — John Wustenberg; C. Tumey Law Group PLLC

(57) ABSTRACT

A method and system for estimating a mud angle. A method may include disposing a downhole tool into a borehole, energizing a button array, transmitting a current from the electrode into a formation, recording the current from the formation with a return electrode to obtain a plurality of measurements, identifying at least one low resistivity zone from the plurality of measurements to produce a measurement set, inverting the measurement set to find a mud angle vector, removing the mud angle vector from the measurement set to obtain a corrected measurement, and obtaining an electrical image using the corrected measurement. A system may include a downhole tool, a conveyance, and an information handling system. The downhole tool may further include at least one electrode and at least one return electrode.

18 Claims, 9 Drawing Sheets

(51) Int. Cl.
*G01V 3/26* (2006.01)
*E21B 49/08* (2006.01)

(56) References Cited

U.S. PATENT DOCUMENTS

| | | | |
|---|---|---|---|
| 2014/0191762 A1* | 7/2014 | Chen ........................ | G01V 3/24 |
| | | | 324/355 |
| 2015/0185354 A1 | 7/2015 | Hayman | |
| 2015/0260874 A1* | 9/2015 | Chen ........................ | G01V 3/38 |
| | | | 324/338 |
| 2017/0227666 A1 | 8/2017 | Legendre et al. | |

OTHER PUBLICATIONS

One Petro Search Results, Dec. 30, 2020, 3 pp. (Year: 2020).*
ISRWO International Search Report and Written Opinion for PCT/US2018/060722 dated Aug. 1, 2019.

* cited by examiner

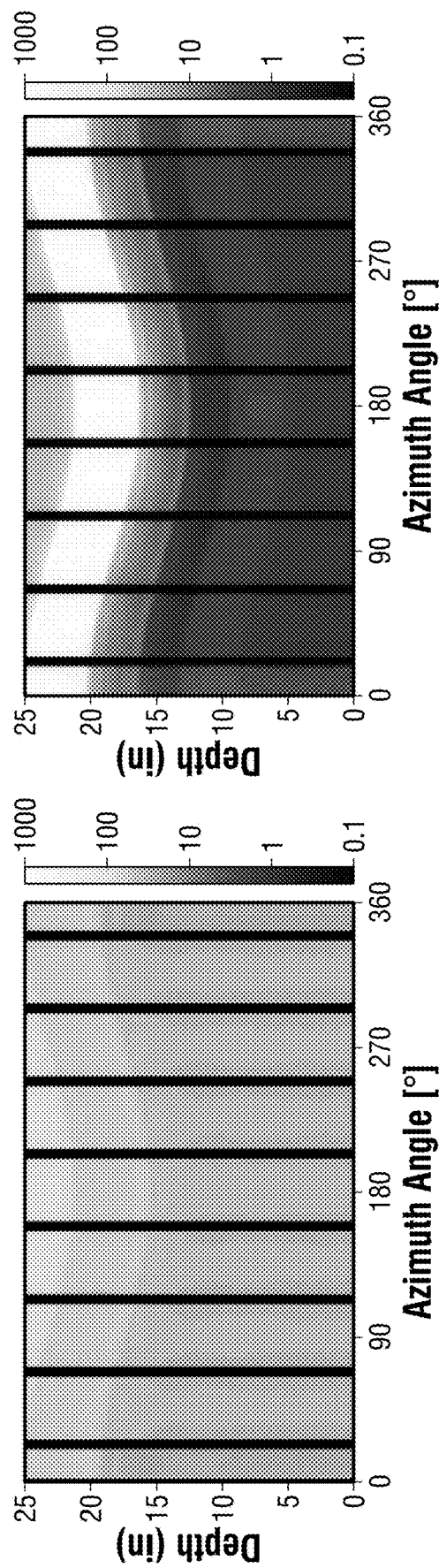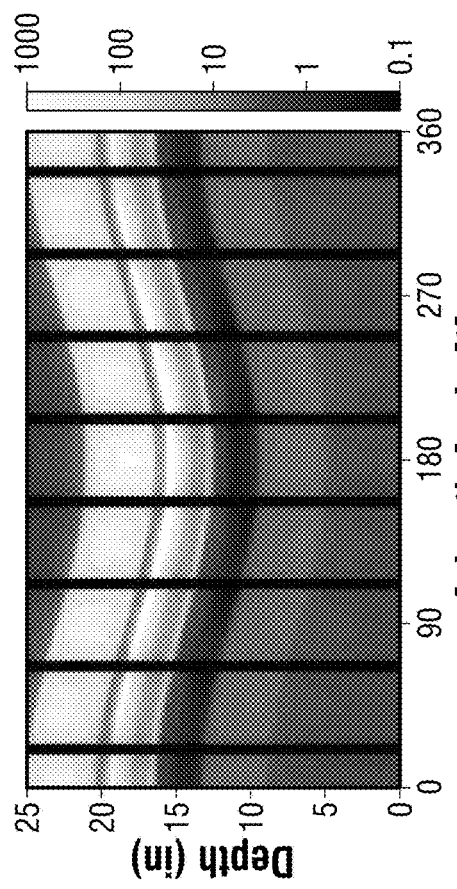
FIG. 11A
FIG. 11B
FIG. 11C

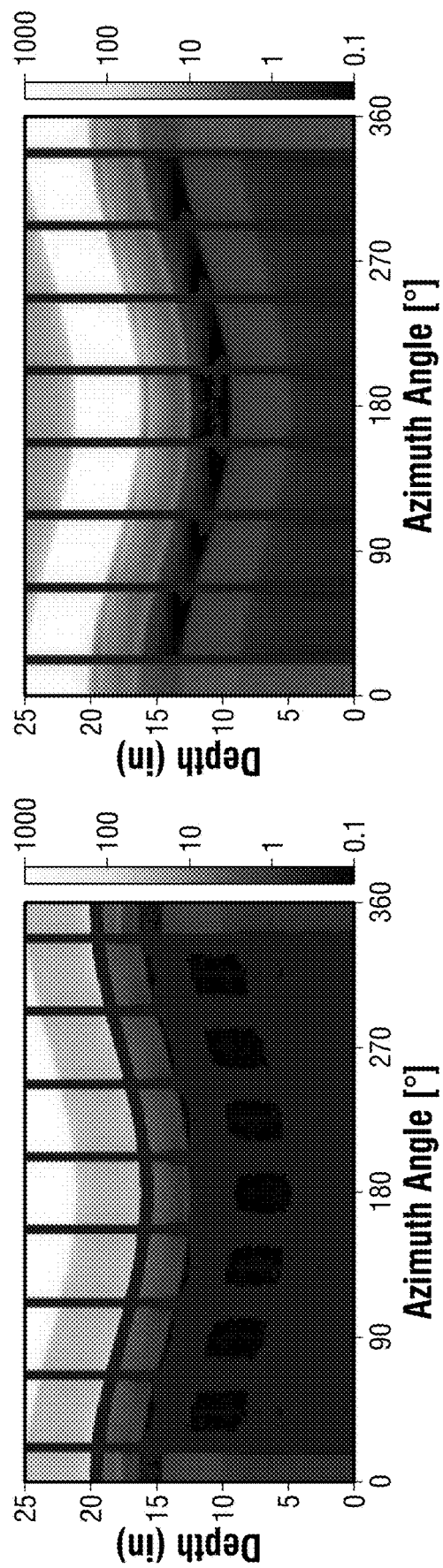
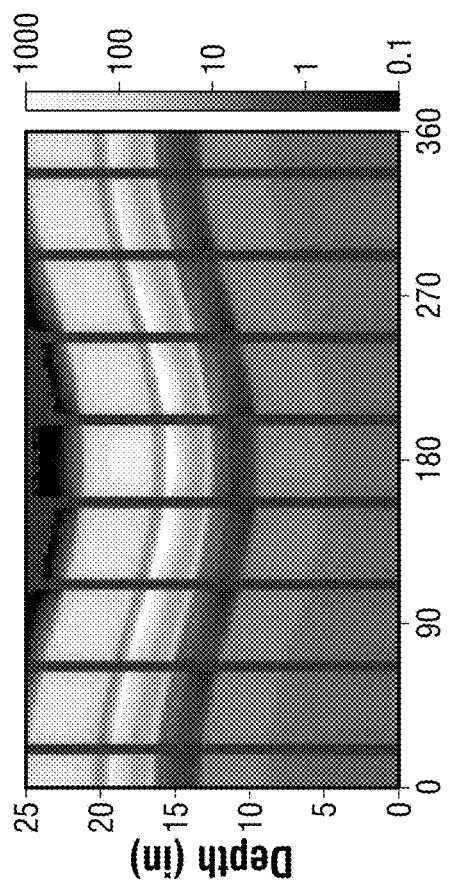
FIG. 12A
FIG. 12B
FIG. 12C

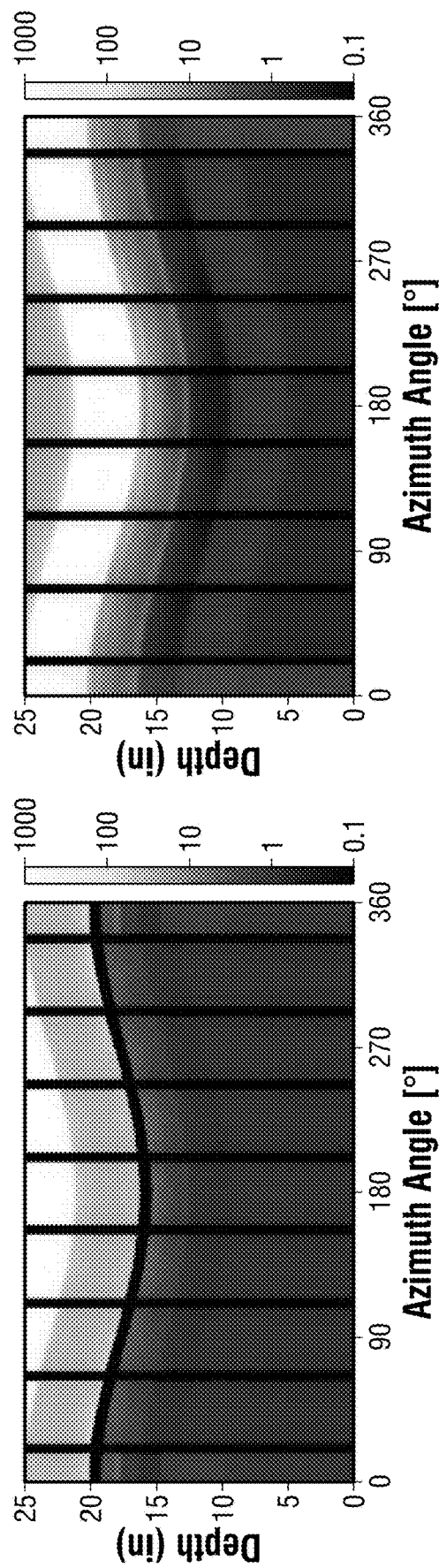
FIG. 13A
FIG. 13B
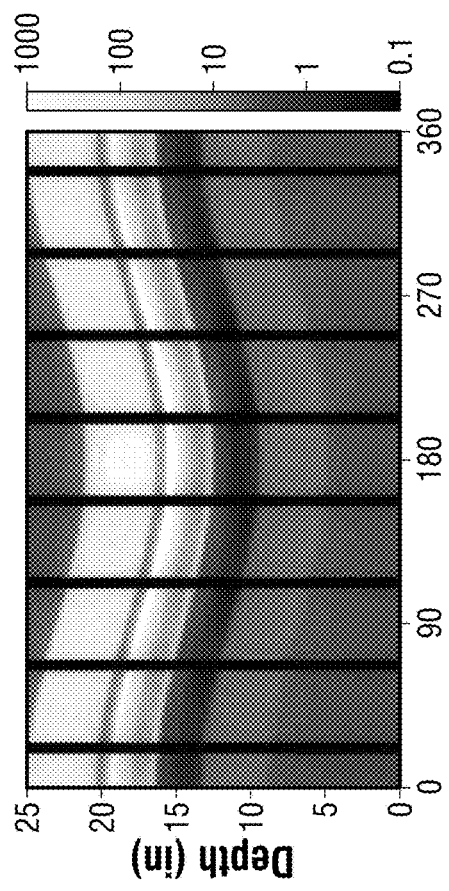
FIG. 13C

METHOD FOR IMPROVING THE ACCURACY OF MUD ANGLE MEASUREMENTS IN BOREHOLE IMAGERS

BACKGROUND

Boreholes drilled into subterranean formations may enable recovery of desirable fluids (e.g., hydrocarbons) using a number of different techniques. A downhole tool may be employed in subterranean operations to determine borehole and/or formation properties.

Traditionally, borehole imager tools may be used in obtaining a detailed characterization of reservoirs. These borehole imager tools may provide a resistivity image of the formation immediately surrounding the borehole. In essence, their function is the electrical equivalent of the formation coring, with much higher borehole coverage. Borehole imager tools may be used to determine formation stratigraphy, dips of the formation layers as well as borehole and formation stress. Borehole imager tools may be particularly important in learning about thin beds and fracture locations. Oil based muds may be preferable to the water based muds in deep water environments where high temperature and pressure cause loss of water and in shale zones where water may cause swelling. However, oil based mud may be highly resistive. At low frequencies, this resistance may reduce the sensitivity of the borehole imager tools to the outside formation. To overcome this effect, the tools may operate at high frequencies. At these high frequencies, pads on the borehole imager tools may become capacitively coupled to the formation, reducing the effect of the oil based mud. However, there is an upper limit to the frequencies that may be used, since at very high frequencies the dielectric effect in formations becomes dominant. As a result, the borehole imager tools may operate at multiple frequencies. A final response may be obtained by combining the results where each frequency is most accurate. Although capacitive coupling may reduce the effect of the highly resistive mud, the effect may still be a significant component of the measured impedance. The effect may be larger in low formation resistivities and higher standoffs between the borehole wall and the button arrays of the borehole imager tool (as well as lower frequencies as stated above.) A projection of the measured impedance in a direction orthogonal to the mud impedance may be used to alleviate this issue. This projection may be determined from the phase angle difference between the mud and measured formation impedances.

BRIEF DESCRIPTION OF THE DRAWINGS

For a detailed description of the preferred examples of the invention, reference will now be made to the accompanying drawings in which:

FIG. 11A illustrates an example of resistivity image at a low frequency;

FIG. 11B illustrates an example of resistivity image at a middle frequency;

FIG. 11C illustrates an example of resistivity image at a high frequency;

FIG. 12A illustrates an example of resistivity image with mud angle removal with a wrong mud angle at a low frequency;

FIG. 12B illustrates an example of resistivity image with mud angle removal with a wrong mud angle at a middle frequency;

FIG. 12C illustrates an example of resistivity image with mud angle removal with a wrong mud angle at a high frequency;

FIG. 13A illustrates an example of resistivity image with mud angle removal after an iterative inversion scheme at a low frequency;

FIG. 13B illustrates an example of resistivity image with mud angle removal after an iterative inversion scheme at a middle frequency; and FIG. 13C illustrates an example of resistivity image with mud angle removal after an iterative inversion scheme at a high frequency.

DETAILED DESCRIPTION

The present disclosure relates generally to a system and method for calculating the mud angle for imaging wells with oil based muds from a downhole device. More particularly, a system and method for taking measurements at different frequencies, calculating the mud angle for each frequency such that differences between responses at different frequencies may be minimized after the mud effect removal, applying the mud effect removal with the calculated mud angles to produce a corrected borehole image, and/or making a petrophysical, drilling or production decision based on the corrected borehole image. The method may allow optimization of the mud angles obtained via measurements. Results of the method may be used as an input to other processes, for example, it may be used as an initial guess or constraint for an inversion that determines mud and formation parameters using the data measured by an imager tool. Alternatively, it may be used by an operator as a starting point in the manual adjustment of the mud removal algorithm in order to enhance the contrast of the borehole image.

Figure 1:
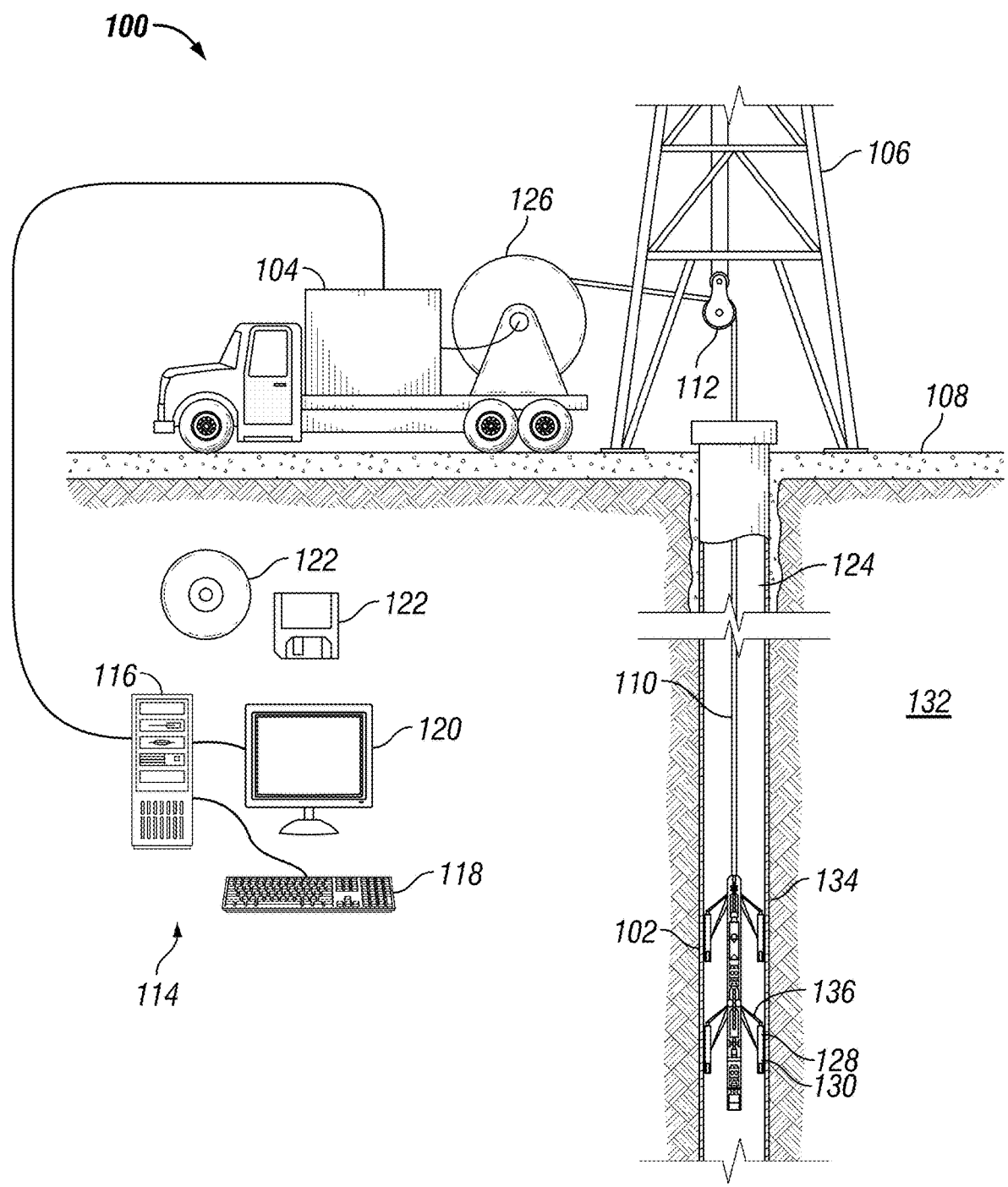
FIG. 1 illustrate an example of a well measurement system.

FIG. 1 illustrates a cross-sectional view of a well measurement system 100. As illustrated, well measurement system 100 may comprise downhole tool 102 attached to a vehicle 104. In examples, it should be noted that downhole tool 102 may not be attached to a vehicle 104. Downhole tool 102 may be supported by rig 106 at surface 108. Downhole tool 102 may be tethered to vehicle 104 through conveyance 110. Conveyance 110 may be disposed around one or more sheave wheels 112 to vehicle 104. Conveyance 110 may include any suitable means for providing mechanical conveyance for downhole tool 102, including, but not limited to, wireline, slickline, coiled tubing, pipe, drill pipe, drill string, downhole tractor, or the like. In some examples, conveyance 110 may provide mechanical suspension, as well as electrical connectivity, for downhole tool 102. Conveyance 110 may comprise, in some instances, a plurality of electrical conductors extending from vehicle 104. Conveyance 110 may comprise an inner core of seven electrical conductors covered by an insulating wrap. An inner and outer steel armor sheath may be wrapped in a helix in opposite directions around the conductors. The electrical conductors may be used for communicating power and telemetry between vehicle 104 and downhole tool 102. Information from downhole tool 102 may be gathered and/or processed by information handling system 114. For example, signals recorded by downhole tool 102 may be stored on memory and then processed by downhole tool 102. The processing may be performed real-time during data acquisition or after recovery of downhole tool 102. Processing may alternatively occur downhole or may occur both downhole and at surface. In some examples, signals recorded by downhole tool 102 may be conducted to information handling system 114 by way of conveyance 110. Information handling system 114 may process the signals, and the information contained therein may be displayed for an operator to observe and stored for future processing and reference. Information handling system 114 may also contain an apparatus for supplying control signals and power to downhole tool 102.

Systems and methods of the present disclosure may be implemented, at least in part, with information handling system 114. While shown at surface 108, information handling system 114 may also be located at another location, such as remote from borehole 124. Information handling system 114 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 114 may be a processing unit 116, a network storage device, or any other suitable device and may vary in size, shape, performance, functionality, and price. Information handling system 114 may include random access memory (RAM), one or more processing resources such as a central processing unit (CPU) or hardware or software control logic, ROM, and/or other types of nonvolatile memory. Additional components of the information handling system 114 may include one or more disk drives, one or more network ports for communication with external devices as well as an input device 118 (e.g., keyboard, mouse, etc.) and video display 120. Information handling system 114 may also include one or more buses operable to transmit communications between the various hardware components.

Alternatively, systems and methods of the present disclosure may be implemented, at least in part, with non-transitory computer-readable media 122. Non-transitory computer-readable media 122 may include any instrumentality or aggregation of instrumentalities that may retain data and/or instructions for a period of time. Non-transitory computer-readable media 122 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

As discussed below, methods may be utilized by information handling system 114 to determine and display a high resolution resistivity image of formation 132 immediately surrounding borehole 124. This high resolution resistivity image may depict boundaries of subsurface structures, such as a plurality of layers disposed in formation 132. These images may be used in reservoir characterization. Images with high resolution may allow accurate identification of thin beds and other fine features such as fractures, clasts and vugs. These images may provide information about the sedimentology, lithology, porosity and permeability of formation 132. The images may complement, or in some cases replace, the process of coring.

In examples, rig 106 includes a load cell (not shown) which may determine the amount of pull on conveyance 110 at the surface of borehole 124. Information handling system 114 may comprise a safety valve which controls the hydraulic pressure that drives drum 126 on vehicle 104 which may reels up and/or release conveyance 110 which may move downhole tool 102 up and/or down borehole 124. Conveyance 110 may provide a means of disposing downhole tool 102 into borehole 124. The safety valve may be adjusted to a pressure such that drum 126 may only impart a small amount of tension to conveyance 110 over and above the tension necessary to retrieve conveyance 110 and/or downhole tool 102 from borehole 124. The safety valve is typically set a few hundred pounds above the amount of desired safe pull on conveyance 110 such that once that limit is exceeded; further pull on conveyance 110 may be prevented.

Downhole tool 102 may comprise a button array 128 and/or a return electrode 130. Button array 128 and/or return electrode 130 may be disposed on at least one pad 134 in any suitable order. For example, a pad 134 may include only button arrays 128 and/or return electrodes 130. Further, a pad 134 may comprise both button array 128 and return electrodes 130. Pads 134 may be attached to at least one arm 136 that may extend from downhole tool 102. Arm 136 may extend pad 134 away from downhole tool 102. In examples, arm 136 may place pad 134 in contact with borehole 124. It should be noted that there may be a plurality of arms 136. One or more arms 136 may place an arrangement of button arrays 128 and/or return electrodes 130 in close proximity to the wall of borehole 124.

In examples, downhole tool 102 may operate with additional equipment (not illustrated) on surface 108 and/or disposed in a separate well measurement system (not illustrated) to record measurements and/or values from formation 132.

Figure 2:
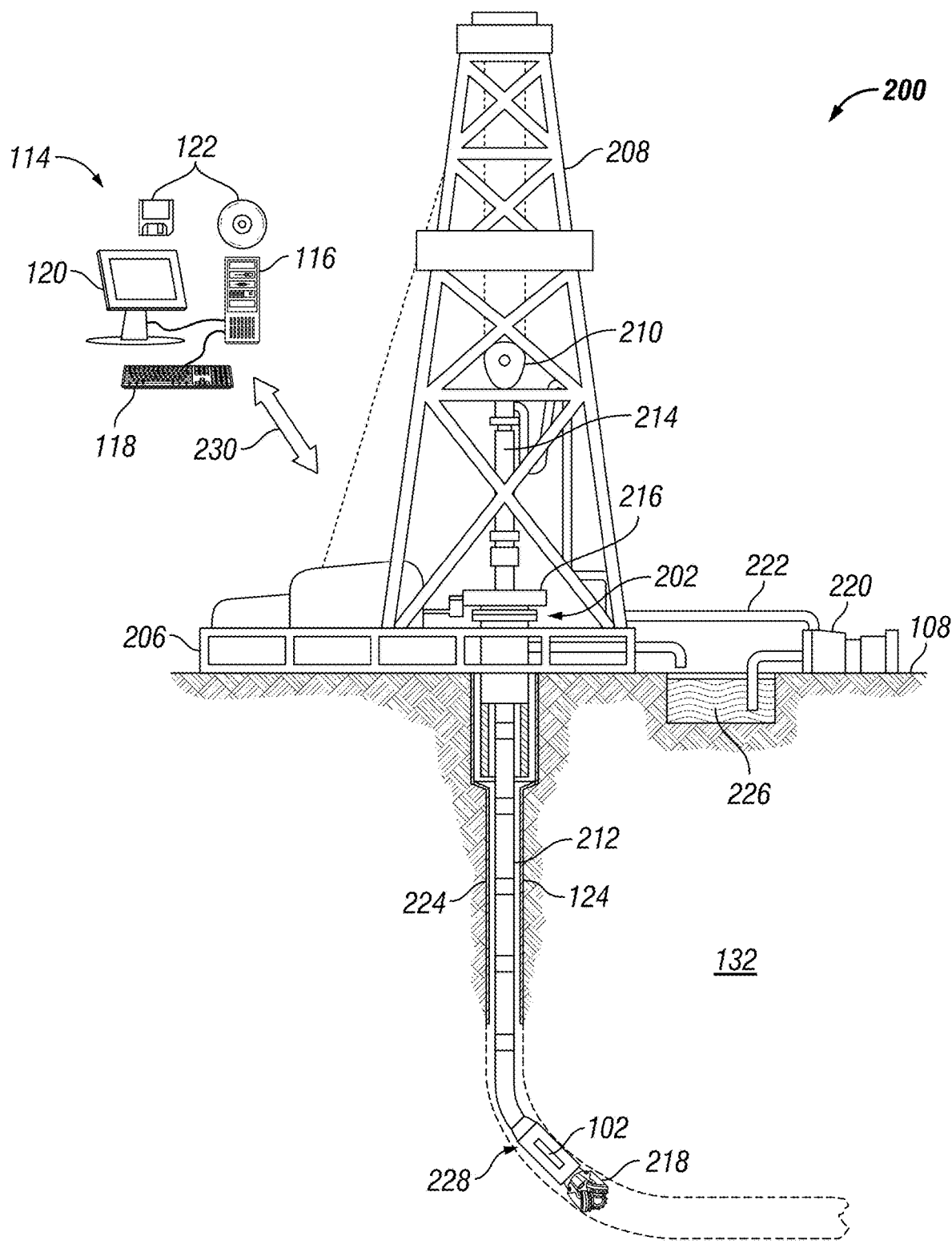
FIG. 2 illustrates another example of a well measurement system.

FIG. 2 illustrates an example in which downhole tool 102 (Referring to FIG. 1) may be disposed in a drilling system 200. As illustrated, borehole 124 may extend from a wellhead 202 into formation 132 from surface 108 (Referring to FIG. 1). Generally, borehole 124 may include horizontal, vertical, slanted, curved, and other types of borehole geometries and orientations. Imaging tools may be used in uncased sections of the borehole. Measurements may be made by imaging tools in cased sections for purposes such as calibration.

As illustrated, borehole 124 may extend through formation 132. As illustrated in FIG. 2, borehole 124 may extend generally vertically into the formation 132, however borehole 124 may extend at an angle through formation 132, such as horizontal and slanted boreholes. For example, although FIG. 2 illustrates a vertical or low inclination angle well, high inclination angle or horizontal placement of the well and equipment may be possible. It should further be noted that while FIG. 2 generally depicts a land-based operation, those skilled in the art may recognize that the principles described herein are equally applicable to subsea operations that employ floating or sea-based platforms and rigs, without departing from the scope of the disclosure.

As illustrated, a drilling platform 206 may support a derrick 208 having a traveling block 210 for raising and lowering drill string 212. Drill string 212 may include, but is not limited to, drill pipe and coiled tubing, as generally known to those skilled in the art. A kelly 214 may support drill string 212 as it may be lowered through a rotary table 216. A drill bit 218 may be attached to the distal end of drill string 212 and may be driven either by a downhole motor and/or via rotation of drill string 212 from surface 108. Without limitation, drill bit 218 may include, roller cone bits, PDC bits, natural diamond bits, any hole openers, reamers, coring bits, and the like. As drill bit 218 rotates, it may create and extend borehole 124 that penetrates various formations 132. A pump 220 may circulate drilling fluid through a feed pipe 222 to kelly 214, downhole through interior of drill string 212, through orifices in drill bit 218, back to surface 108 via annulus 224 surrounding drill string 212, and into a retention pit 226.

With continued reference to FIG. 2, drill string 212 may begin at wellhead 202 and may traverse borehole 124. Drill bit 218 may be attached to a distal end of drill string 212 and may be driven, for example, either by a downhole motor and/or via rotation of drill string 212 from surface 108 (Referring to FIG. 1). Drill bit 218 may be a part of bottom hole assembly 228 at distal end of drill string 212. Bottom hole assembly 228 may further comprise downhole tool 102 (Referring to FIG. 1). Downhole tool 102 may be disposed on the outside and/or within bottom hole assembly 228. As will be appreciated by those of ordinary skill in the art, bottom hole assembly 228 may be a measurement-while drilling (MWD) or logging-while-drilling (LWD) system.

Without limitation, bottom hole assembly 228 may be connected to and/or controlled by information handling system 114 (Referring to FIG. 1), which may be disposed on surface 108. Without limitation, information handling system 114 may be disposed down hole in bottom hole assembly 228. Processing of information recorded may occur down hole and/or on surface 108. Processing occurring downhole may be transmitted to surface 108 to be recorded, observed, and/or further analyzed. Additionally, information recorded on information handling system 114 that may be disposed down hole may be stored until bottom hole assembly 228 may be brought to surface 108. In examples, information handling system 114 may communicate with bottom hole assembly 228 through a fiber optic cable (not illustrated) disposed in (or on) drill string 212. In examples, wireless communication may be used to transmit information back and forth between information handling system 114 and bottom hole assembly 228. Information handling system 114 may transmit information to bottom hole assembly 228 and may receive as well as process information recorded by bottom hole assembly 228. In examples, a downhole information handling system (not illustrated) may include, without limitation, a microprocessor or other suitable circuitry, for estimating, receiving and processing signals from bottom hole assembly 228. Downhole information handling system (not illustrated) may further include additional components, such as memory, input/output devices, interfaces, and the like. In examples, while not illustrated, bottom hole assembly 228 may include one or more additional components, such as analog-to-digital converter, filter and amplifier, among others, that may be used to process the measurements of bottom hole assembly 228 before they may be transmitted to surface 108. Alternatively, raw measurements from bottom hole assembly 228 may be transmitted to surface 108.

Any suitable technique may be used for transmitting signals from bottom hole assembly 228 to surface 108, including, but not limited to, wired pipe telemetry, mud-pulse telemetry, acoustic telemetry, and electromagnetic telemetry. While not illustrated, bottom hole assembly 228 may include a telemetry subassembly that may transmit telemetry data to surface 108. Without limitation, an electromagnetic source in the telemetry subassembly may be operable to generate pressure pulses in the drilling fluid that propagate along the fluid stream to surface 108. At surface 108, pressure transducers (not shown) may convert the pressure signal into electrical signals for a digitizer (not illustrated). The digitizer may supply a digital form of the telemetry signals to information handling system 114 via a communication link 230, which may be a wired or wireless link. The telemetry data may be analyzed and processed by information handling system 114.

As illustrated, communication link 230 (which may be wired or wireless, for example) may be provided that may transmit data from bottom hole assembly 228 to an information handling system 114 at surface 108. Information handling system 114 may include a processing unit 116 (Referring to FIG. 1), a video display 120 (Referring to FIG. 1), an input device 118 (e.g., keyboard, mouse, etc.) (Referring to FIG. 1), and/or non-transitory computer-readable media 122 (e.g., optical disks, magnetic disks) (Referring to FIG. 1) that may store code representative of the methods described herein. In addition to, or in place of processing at surface 108, processing may occur downhole.

Figure 3:
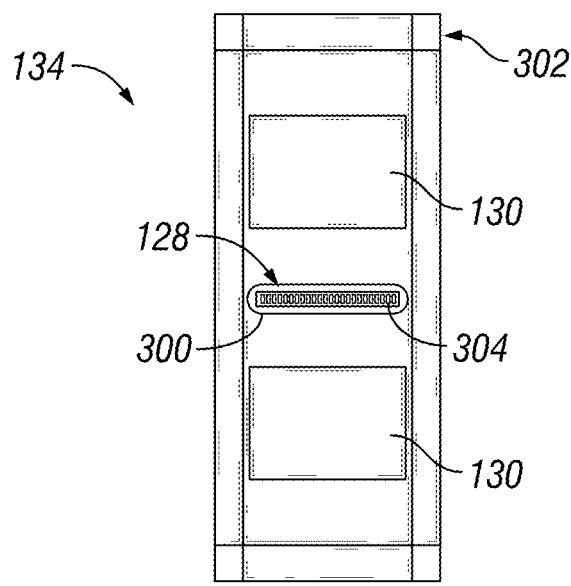
FIG. 3 illustrates an example of a pad.

FIG. 3 illustrates an example of pad 134. It should be noted that pad 134 may be connected to downhole tool 102 (e.g., referring to FIGS. 1 and 2). Pad 134 may serve to place button array 128 and/or return electrode 130 in contact with or in close proximity to borehole 124. Pad 134 may comprise a button array 128, a return electrode 130, a guard 300, and a housing 302. In examples, there may be a plurality of button arrays 128. In examples, return electrode 130 and button array 128 may be disposed directly on downhole tool 102. Button array 128 may comprise an electrode 304, wherein electrode 304 may be a sensor that senses impedance of formation 132. It should be noted that electrode 304 may be a button electrode. There may be any suitable number of electrodes 304 within button array 128 that may produce a desired, predetermined current. Without limitation, the range for a suitable number of electrodes 304 within button array 128 may be from about one electrode 304 to about one hundred electrodes 304. For example, the range for a suitable number of electrodes 304 within button array 128 may be from about one electrode 304 to about twenty-five electrodes 304, from about twenty-five electrodes 304 to about fifty electrodes 304, from about fifty electrodes 304 to about seventy-five electrodes 304, or from about seventy-five electrodes 304 to about one hundred electrodes 304.

In examples, there may be a plurality of return electrodes 130. One of the return electrodes 130 may be disposed on one side of button array 128, and another one of the return electrodes 130 may be disposed on the opposite side of button array 128. These return electrodes 130 may be disposed at equal distances away from button array 128 or at varying distances from button array 128. In examples, a voltage difference between button array 128 and return electrodes 130 may be applied, which may cause currents to be emitted from button array 128 into the mud (not illustrated) and formation 132 (referring to FIG. 1).

During operations, an operator may energize button array 128. A voltage may be applied between each electrode 304 and return electrode 130. The level of the voltage may be controlled by information handling system 114. This may cause currents to be transmitted through button array 128. These currents may travel through the mud and formation 132 and may reach back to return electrode 130. The amount of current emitted by each electrode 304 may be inversely proportional to the impedance seen by that electrode 304. This impedance may be affected by the properties of formation 132 and the mud directly in front of each electrode 304. Therefore, current emitted by each electrode 304 may be measured and recorded in order to obtain an image of the resistivity of formation 132.

In examples, a current may be transmitted from a transmitting electrode and return to return electrode 130. These two electrodes may be referred to as the current electrodes. Then, the voltage drop across a set of electrodes (e.g., button array 128) may be measured and used to estimate the impedance of formation 132. In these alternative implementations, electrodes 304 may be referred to as voltage electrodes or monitor electrodes.

Guard 300 may help to focus most of the current produced by button array 128 into formation 132 radially. Guard 300 may be disposed around button array 128. Guard 300 may include the same potential as button array 128.

In examples, housing 302 may serve to protect button array 128 and return electrodes 130 from the surrounding mud and formation 132. Housing may be made with any suitable material. Without limitation, suitable material may be metals, nonmetals, plastics, ceramics, composites and/or combinations thereof. In examples, housing 302 may be a metal plate. Housing 302 may be connected through arm 136 to downhole tool 102 (referring to FIG. 1). An insulating material may be used to fill the remaining portions of pad 134. In examples, ceramics may be used as the insulating material to fill the remaining portions of pad 134.

An impedance value may be calculated through the current transmitting between an electrode 304 and formation 132 for each electrode 304. The voltage between button array 128 and return electrodes 130 may be measured and divided by the transmitted current to produce a value for the impedance seen by each electrode 304. Most of the transmitted current may be returned to return electrodes 130 although some portions of it may return through housing 302 and downhole tool 102 (referring to FIG. 1).

Figure 4:
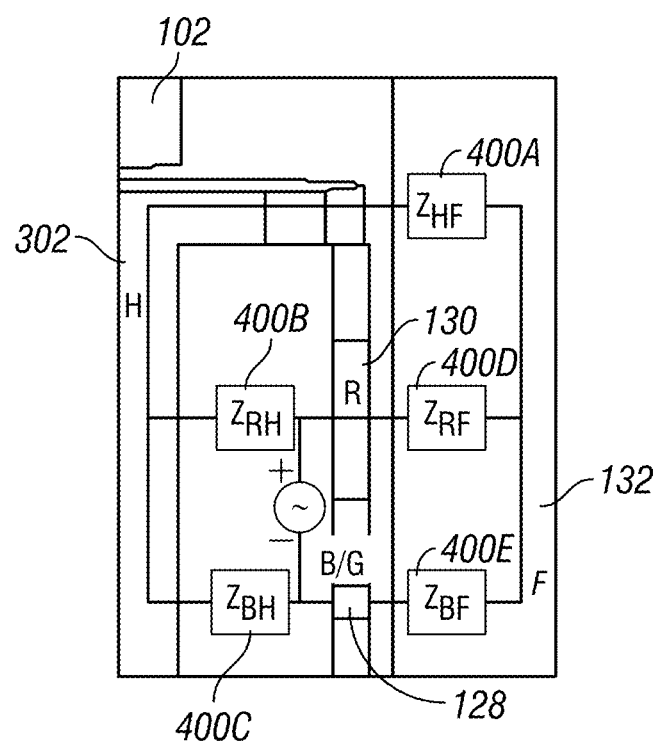
FIG. 4 illustrates an example of a circuit model of a downhole tool.

FIG. 4 illustrates an example of a circuit model that may approximate the downhole tool 102. Effects of the transmitted current may be approximately characterized by a housing-to-formation impedance value 400A, a return electrode-to-housing impedance value 400B, a return electrode-to-formation impedance value 400C, a button-to-housing impedance value 400D, and a button-to-formation impedance value 400E. Impedance may be calculated below, wherein Z is the impedance, $V_{BR}$ is the button-to-return electrode voltage and $I_B$ is the button current:

$$Z = \frac{V_{BR}}{I_B} \quad (1)$$

The value calculated in Equation (1) may be equal to $Z_{BF}+Z_{RF}$, as shown in FIG. 4, wherein $Z_{BF}$ is the impedance from electrode 304 to formation 132 and $Z_{RF}$ is the impedance of return electrode 130 to formation 132. Note that for different electrodes 304 of the button array 128, these impedances may differ based on the variations in borehole 124 (e.g., Referring to FIG. 1) and the environment. These variations in measured impedances in an impedance image may be used to determine geophysical features. Also note that both $Z_{BF}$ and $Z_{RF}$ have contributions from both the surrounding mud and formation 132 (referring to FIG. 1). Thus, equivalently it can be written in Equation (2) as:

$$Z \approx Z_{BF} = Z_{mud} + Z_F \quad (2)$$

As a result, measured impedance may have contributions from both the mud and formation 132, wherein $Z_{mud}$ is the impedance of the mud and $Z_F$ is the impedance of formation 132. Imaginary parts of $Z_F$ and $Z_{mud}$ may be assumed to be mainly capacitive. Assuming this capacitance may be in parallel with the resistive portion, then $Z_{BF}$ may also be written as:

$$Z_{BF} = \frac{1}{\left(\frac{1}{R_M} + j\omega C_M\right)} + \frac{1}{\left(\frac{1}{R_F} + j\omega C_F\right)} \quad (3)$$

wherein $R_M$ is the mud resistance, $R_F$ is the resistance of formation 132, $C_M$ is the mud capacitance, $C_F$ is the capacitance of formation 132, j is the unit imaginary number, and ω is the angular frequency. Both the mud resistance and mud capacitance may increase as standoff increases and may decrease with the increase in effective area of button array 128. "Standoff" may be used to denote the distance of the pad 134 (e.g., Referring to FIG. 3) from a wall of borehole 124 (e.g., Referring to FIG. 1). Standoff of each electrode 304 in button array 128 may vary. In examples, standoffs of return electrode 130 may differ from those of electrodes 304 as well. Standoff variations may significantly affect button-to-formation impedance value 400E. In the simplified circuit model, it may be assumed that the standoff of each component of pad 134 may be constant. Standoff may assume that pad 134 is movable while downhole tool 102 remains immobile. In examples, to achieve large distances from the wall of borehole 124, downhole tool 102 may be moved along with pad 134. In examples, the term "eccentricity" may be used instead of "standoff". The proposed methods (discussed further below) may be equally valid whether pad 134 moves or both pad 134 and downhole tool 102 move.

Figure 5:
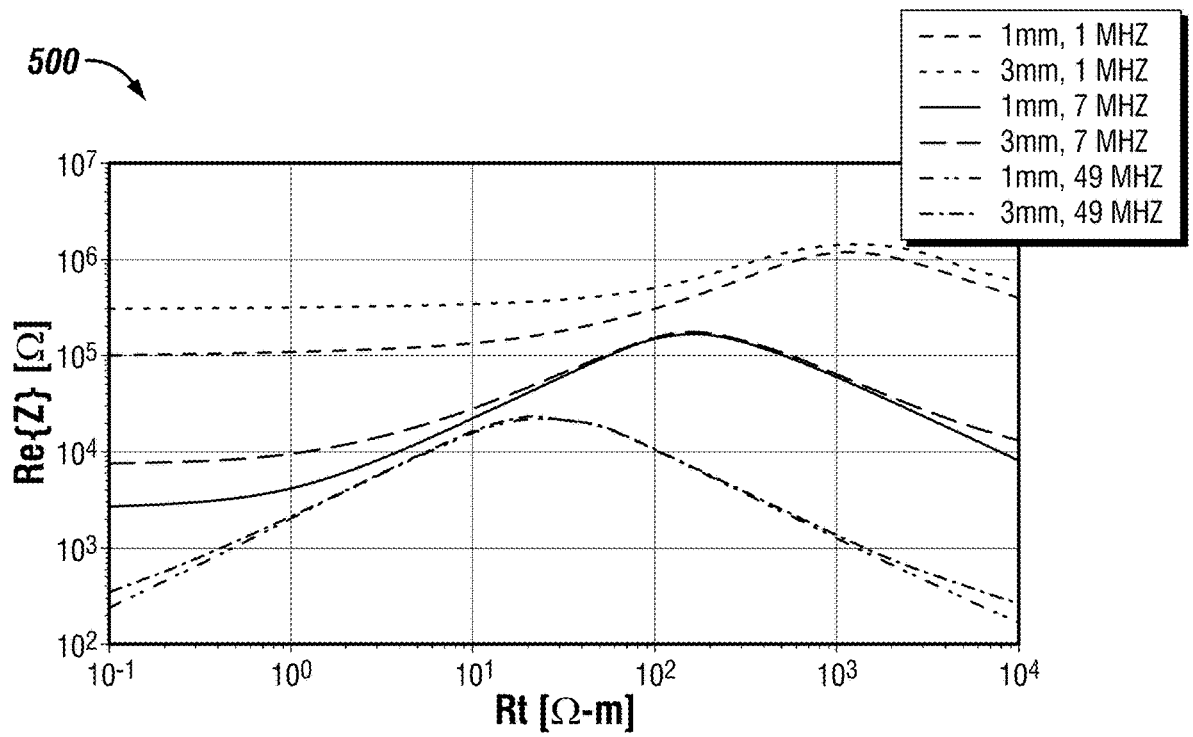
FIG. 5 illustrates a graph of the real part of the measured impedance versus the formation resistivity.

Equation (3) may be used to obtain basic performance curves for downhole tool 102. These basic performance curves may be fairly accurate in homogeneous formations 132 in determining the variation of the response of an exemplary electrode 304 in button array 128 with changing environmental parameters. In FIG. 5, the real part of the measured impedance versus the formation resistivity may be determined using Equation (3), which is illustrated on graph 500 in FIG. 5. The imaginary part of the impedance may be determined by the mud capacitance, therefore it may not be necessary to plot it. In an example, illustrated in FIG. 5, it may be assumed that formation permittivity (εF) is 15, mud permittivity (εM) is 6, and mud resistivity (ρM) is 8000 Ω-m. Results for three different frequencies (1 MHz, 7 MHz and 49 MHz) at two different standoffs (so=1 mm and so=3 mm), where (so) stands for standoff of the tool, may be displayed in FIG. 5.

As illustrated in FIG. 5, a separation between different standoffs at lower formation resistivities may be viewed. This effect may be more pronounced if the frequency is lower. At higher formation resistivities, the dielectric effect in formation 132 (e.g., Referring to FIG. 1) may cause a roll-off in measured impedance, as illustrated in FIG. 5. Operating in a linear region of the curve, displayed in FIG. 5, may produce a more accurate correspondence between the impedance image and that of the true formation resistivity. The standoff effect at low formation resistivities may cause an ambiguity in the interpretation of the impedance images. These raw measurements may be used, but the contrast of the resitivity image may be reduced. Furthermore, small errors in standoff measurements may cause a large difference in the impedance reading. It may be observed from FIG. 5 that measured impedance may begin to decrease as the formation resistivity increases. This "rolloff" may be caused by the dielectric effects in the formation 132 (e.g., Referring to FIG. 1) and may become more pronounced at higher frequencies.

In examples, a method may be used that makes use of data obtained at different frequencies to calculate the mud angle. The mud angle may be the phase angle of the impedance of the mud. In examples, the mud angle may be the arctangent of the ratio of the imaginary and the real parts of the complex impedance as it is commonly known by those skilled in the art. In examples, the mud angle will be different at each operating frequency. The mud angle may be used in mud removal schemes to eliminate the effect of the mud (or equivalently the standoff). An example of such a scheme may be a Z90 processing scheme. The proposed method may be based on the nature of processed values of the impedances at different frequencies, which may be very close to each other in the region where there may not be a dielectric roll-off, if the correct mud angles are used in processing. This may be reflected in the graph of FIG. 6. It should be noted that FIG. 6 may be based on a basic circuit approximation. However, the basic circuit approximation of the circuit model in FIG. 4 may be fairly accurate in predicting the behavior of downhole tool 102, specifically for thick beds in formation 132 (e.g., Referring to FIG. 1). It should be noted that graph 600 in FIG. 6 may be obtained assuming the mud angle was known. Equation (3) may then be used to plot graph 600 in FIG. 6. The mud angle may be calculated theoretically using the known mud resistivity and permittivity as:

TABLE 1

Theoretical Mud Angle Calculated Using the Circuit Model

| 1 MHz | 7 MHz | 49 MHz |
|---|---|---|
| −69.47° | −86.9377° | −89.5621° |

The calculated mud angle may be different at different frequencies which may be shown in Table 1. Although the term mud angle (singular) may be used for simplicity in the majority of the disclosure, it should be kept in mind that mud angle may vary with frequency. In an example, exact properties of the mud may not be known, and thus may be measured. In an example, the properties of a mud may be measured by closing arms 136 of downhole tool 102. This may minimize any effects from formation 132 (e.g., Referring to FIG. 1). However, the measurement may still include some contributions from formation 132 and may further include system and environmental noise.

Figure 7:
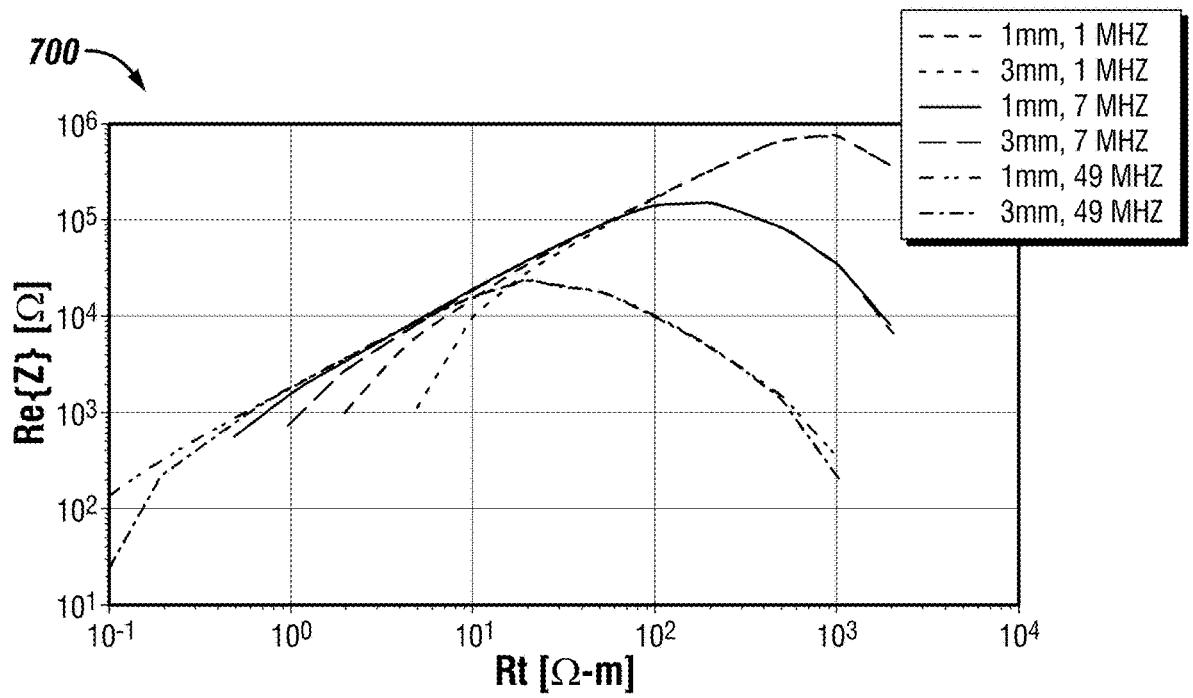
FIG. 7 illustrates a graph of the real part of the measured impedance versus the formation resistivity after processing with an incorrect mud angle.

FIG. 7 illustrates the effect of noise on measurements in graph 700, wherein graph 700 depicts the real part of impedance verses formation resistivity after the application of a mud effect removal technique implemented for an incorrect mud angle. In an example, the effect of noise may be illustrated by shifting the theoretical mud angle values, calculated in Table 1, from their exact values. In an example, the theoretical mud angle values may be shifted by 0.5°. In examples, a Z90 processing scheme may be utilized to calculate the results from noise in measurement taken by downhole tool 102 (e.g., Referring to FIG. 1). Results from Z90 processing may be plotted on graph 700, as illustrated in FIG. 7. Values of the mud angle used to obtain FIG. 7 may be represented in Table 2. As illustrated in FIG. 7, a slight inaccuracy in the mud angle measurement may cause a significant deviation between the frequencies in the impedance calculated using the mud removal algorithm.

TABLE 2

Figure 6:
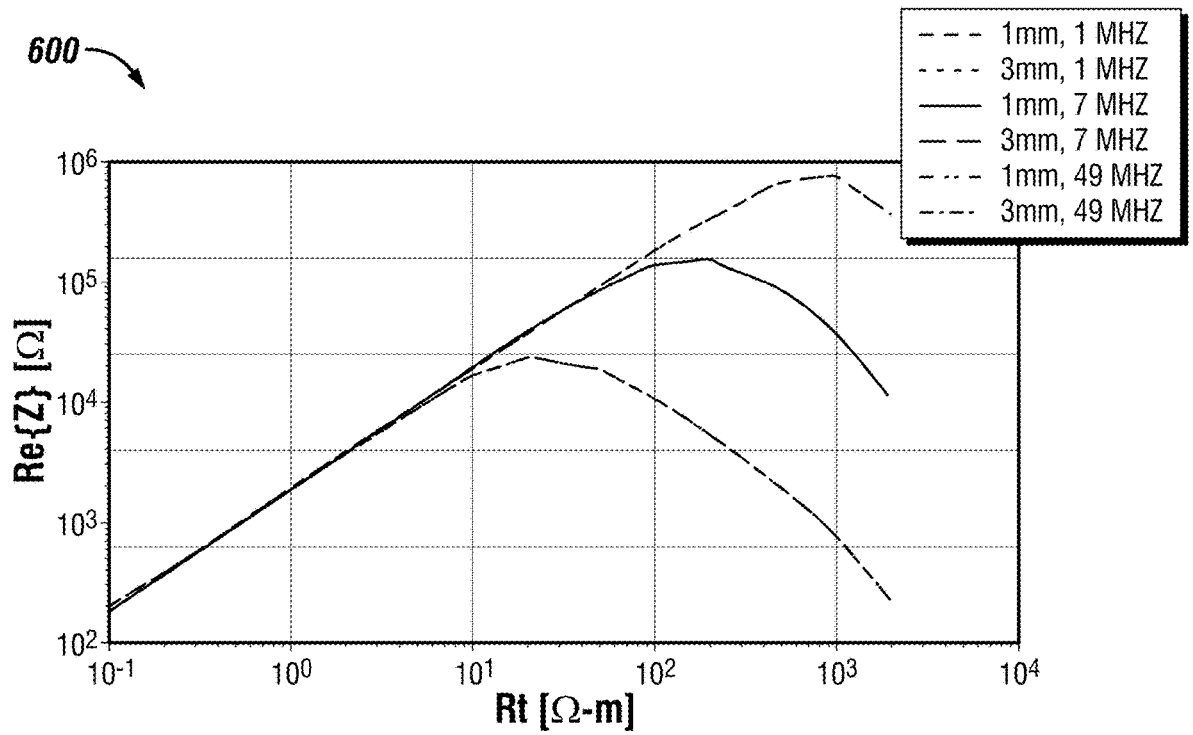
FIG. 6 illustrates a graph of the real part of the measured impedance versus the formation resistivity after processing.

Mud Angle Values used in FIG. 6

| 1 MHz | 7 MHz | 49 MHz |
|---|---|---|
| −68.97° | −86.4377° | −89.0621° |

Figure 8:
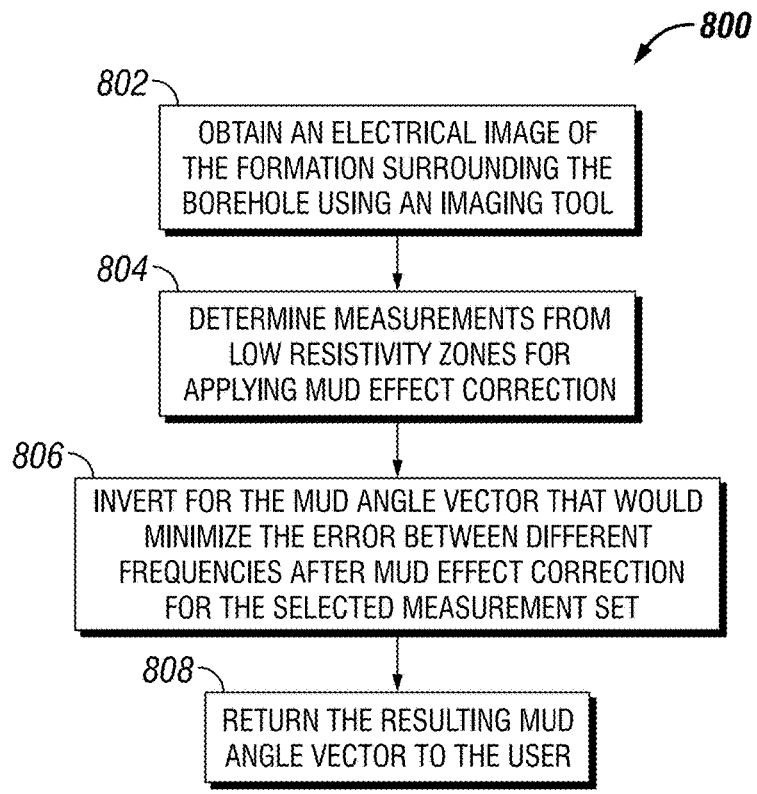
FIG. 8 illustrates a workflow to improve the accuracy of mud angle measurements.

FIG. 8 illustrates a workflow 800 for the proposed scheme to improve the accuracy of mud angle measurements with downhole tool 102 (e.g., Referring to FIG. 1). Workflow 800 may begin with first step 802. First step 802 may include obtaining an electrical image of formation 132 immediately surrounding the borehole 124 using downhole tool 102 (i.e., an electromagnetic imaging tool). It should be noted that the electrical image may include, but is not limited to, images related to resistivity, capacitance, conductivity, inductance, current, voltage, and/or the like. In second step 804, measurements from low resistivity zones may be determined for applying mud effect correction. In examples, a low resistivity zone may be identifies by a significant mud effect in measurements. A low resistivity zone may depend on formation 132, mud properties, and the design of downhole tool 102. If there is a significant mud effect in measurements, these effects may be most visible in such low resistivity zones.

In examples, for the parameters used to obtain FIG. 5, any resistivity lower than ~5 Ohm-meters may be considered a low resistivity. It may be preferable to use a different approach that may be more suitable for automatization in determining such low resistivity zones. In an example, this may be based on a histogram of the absolute value of impedance measurements. Absolute value may be preferable to the real part of the impedance measurements since it may have more monotonically increasing behavior than the real part with respect to the formation resistivity. As such, these measurements may not exhibit the dielectric roll off behavior which may cause errors in selection process. Then, the "test measurements" for optimization may be selected among the measurements with relatively lower absolute impedance values. In a non-limiting example, measurements that may be in the lowest 25% may be selected. To simplify computations, a subset of these measurements may be selected. For example, five hundred points among the ones with absolute impedances in the lowest 25% may be selected randomly. In some cases, lowest impedances may be undesirable due to noise or effects such as the tool body effect. In those cases, a lower threshold on absolute impedances may be applied. For example absolute impedances between 5% and 25% may be used. Note that these values may be meant to provide examples as actual values may depend on downhole tool 102 and the application.

In third step 806, mud angle vector (i.e., the mud angle for each operating frequency) that may minimize the difference of the processed data obtained from three different frequencies may be found through inversion. Inversion may be performed through any suitable method. For example, a search may be performed by making a discrete grid of mud angles for each frequency. Calculating the norm of the error between processed impedances of different frequencies is given by Equation (5), shown below, for each mud angle combination and selecting the combination that gives the minimum error.

$$\left\| \begin{array}{c} (\overline{R_c}^2 - \overline{R_c}^1)/\overline{R_c}^1 \\ \vdots \\ (\overline{R_c}^x - \overline{R_c}^1)/\overline{R_c}^1 \\ \vdots \\ (\overline{R_c}^x - \overline{R_c}^{x-1})/\overline{R_c}^{x-1} \end{array} \right\| \quad (5)$$

In Equation (5), Rc may denote the real part of the corrected impedance and the superscript may denote the frequency index (i.e. for a total number of frequencies N). Overbars may denote vectors and they may imply that this error may be computed for every sample measurement selected in the second step. In examples, not all available frequencies may be used. For example, if a frequency channel produces noisy data it may be omitted from computations. However, at least two frequencies may be needed for the computations.

In an example, an inversion may be an iterative inversion based on a conjugant gradient method. Examples of such methods may include but are not limited to, the Gauss-Newton algorithm, the Levenberg-Marquardt algorithm, and the like. In an example, a predetermined threshold may be applied on the imaging data to come up with the data set rather than the histogram approach discussed above. This threshold may be applied to real, imaginary, and/or absolute part of the data. There may be multiple thresholds for different frequencies, or the threshold may be applied to a single frequency (with the data from other frequencies that correspond to the logging points determined in this way also included in the final data set.) In some other cases, an operator may manually select regions of the image log suitable for applying the mud effect removal (e.g., regions with low resistivities that show the mud effect). An operator may use the data from downhole tool 102 (e.g., Referring to FIG. 1), or data from other tools that logged the same formation may be used to help determine suitable regions. These alternate tools may include resistivity tools based on induction or galvanic principles such as a multi component induction tool or an array laterolog. In other cases, this process may be automated by selecting data from regions with low resistivities as determined by other tools. A workflow of an iterative inversion scheme in third step 806 may be illustrated in FIG. 9.

Figure 9:
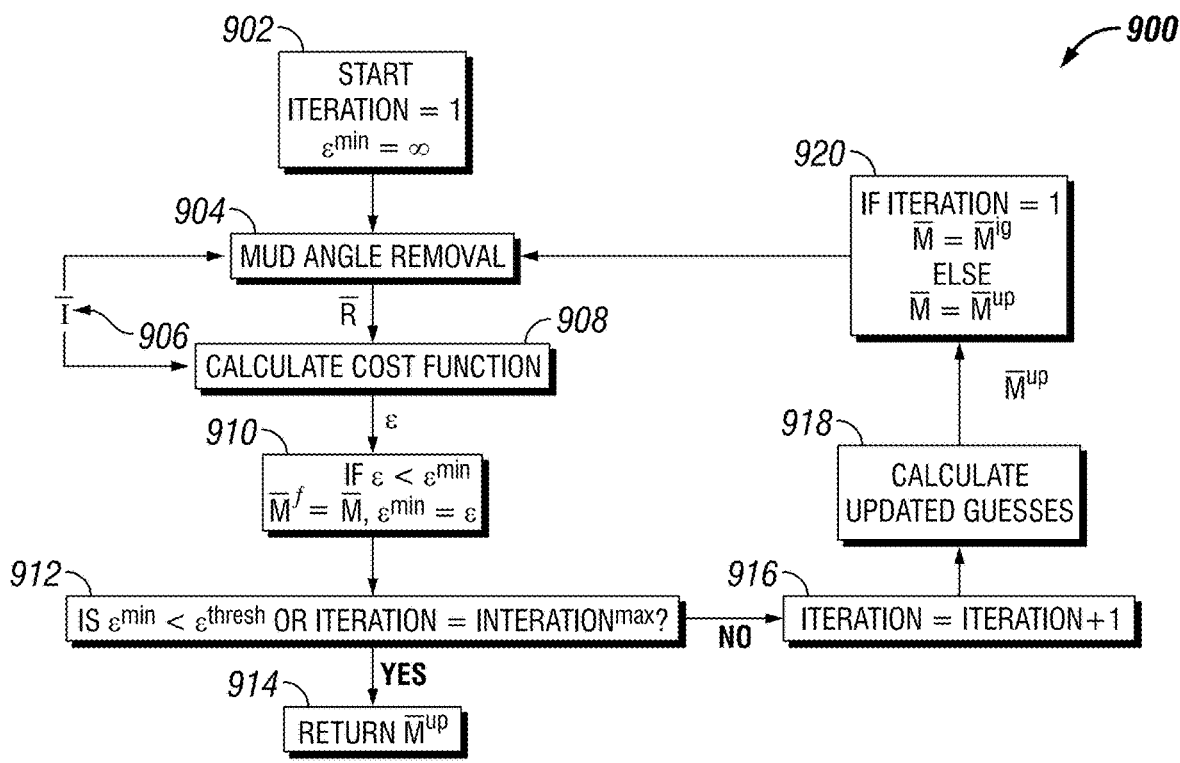
FIG. 9 illustrates a workflow of an iterative inversion scheme.

FIG. 9 illustrates an example workflow for an iterative inversion scheme 900. In this example, iterative inversion scheme 900 may begin with first step 902, which may include a first iteration of the inversion minimum value of the cost function (εmin), which may be set to a large value, such as the largest number that the computer architecture may process to make sure it is replaced with the value calculated in the first iteration of the algorithm. In a second step 904, a mud angle removal scheme, such as Z90 processing (discussed above), may then be applied to the data set 906 selected for optimization as described before (denoted by I) using an initial guess for the mud angle vector (e.g., M), where an overbar may represent a vector. Output of the processing may be denoted by R. These processed results may be used to calculate in third step 908 with a cost function such as the one in Equation (5).

In some cases, the cost function may have additional regularization terms. For example, higher frequencies may be relatively unaffected by mud effect, which may allow high frequencies to be utilized to stabilize the outputs and reducing the ambiguity of the solution. In that case, cost function may take the form, again as an example:

$$\left\| \begin{array}{c} (\overline{R_c}^2 - \overline{R_c}^1)/\overline{R_c}^1 \\ \vdots \\ (\overline{R_c}^x - \overline{R_c}^1)/\overline{R_c}^1 \\ \vdots \\ (\overline{R_c}^x - \overline{R_c}^{x-1})/\overline{R_c}^{x-1} \\ (\overline{I}^N - \overline{R_c}^1)/\overline{R_c}^1 \\ (\overline{I}^N - \overline{R_c}^x)/\overline{R_c}^x \end{array} \right\| \quad (6)$$

In examples, it may be assumed that frequency index N corresponds to the highest frequency and thus $\overline{I}^N$ may be the vector representing the measurements made at the highest frequency. When the value of the cost function (ε) may be computed, it may then be compared in step 910 with a stored minimum value obtained thus far (εmin). If the result of step 910 produces a better match, εmin may be replaced with ε and final guess for the mud angle ($M^f$) may be updated by the guess used for step 910. This may be utilized for a first iteration.

In step 912, a convergence test may be performed to determine if a reasonable result is obtained and whether or not the simulation should end. For example, εmin may be compared with a predetermined threshold ($\varepsilon^{thres}$) to check whether the inverted mud angle vector gives a response that is close to the desired response (as defined by the cost function) within a specified accuracy. Additionally, the number of iterations may be compared with a set maximum number of iterations (iteration$^{max}$.) to make sure inversion ends in a reasonable amount of time if the norm of the cost function does not go below the predetermined threshold in that number of iterations. Convergence test in step 912 may look for conditions that may be described as $\varepsilon^{min} < \varepsilon^{thres}$ or iteration=iteration$^{max}$. If these conditions are met, $M^{up}$ may be returned as a final result in step 914. Otherwise, iteration count may be increased by 1 in step 916. A new guess may be presented and steps 902-912 may be repeated. Then M may be calculated in step 920, with an inversion scheme such as a Levenberg-Marquardt algorithm, and steps 902-912 may be repeated. This may end iterative inversion scheme 900 within third step 806 of FIG. 8.

Figure 10:
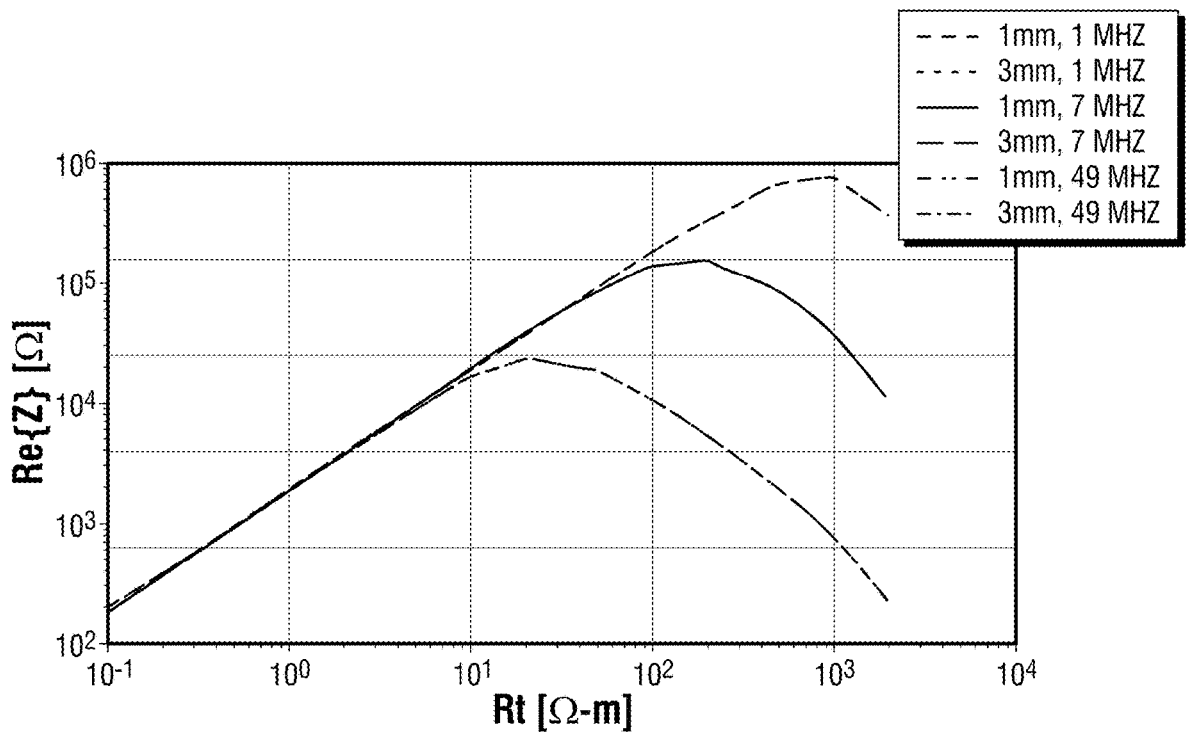
FIG. 10 illustrates a graph of the real part of the measured impedance versus the formation resistivity after processing after an iterative inversion scheme.

In step 808, calculated mud angle may be returned to an operator along with processed images with mud effect removal using the selected mud angles. This may be depicted in FIG. 10. An operator may use the returned mud angle values as is, or it may be used as a starting point for further manual tweaking. Mud angle values obtained using the above procedure and applying it to the case described in FIGS. 6 and 7 may produce the following results:

TABLE 3

| Mud Angle Values obtained with Inversion | | |
|---|---|---|
| 1 MHz | 7 MHz | 49 MHz |
| −69.47° | −86.9377° | −89.5671° |

In some examples, variation of the mud angle with the changing temperature (which may be a function of depth) may be taken into account. In such examples, the mud angle may be calculated using a measurement set obtained from measurements in close proximity to each other (such as 100 ft) where no significant change in mud properties may be expected. It may be common practice to estimate the gradient change in mud properties (such as the mud resistivity and mud permittivity) using an assumed temperature profile in a well. As mud angle may be defined as the phase of the impedance of the mud, and mud impedance, as described by the first term of Equation (3) depends on these mud properties, a gradient for the mud angle may be calculated and may be used to extrapolate the value of the mud angle around the zone where the mud angle is calculated. In an alternate example, the mud angle may be calculated in two or more distinct zones and the results may be used to determine the gradient profile of the mud angle.

Initial value of the mud angle may be selected, as shown in Table 3, which may give an erroneous result in FIG. 7. It may be seen that true mud angles were recovered with little error (error at 49 MHz is 0.005°, and this frequency may be the least sensitive to the mud effect.) It should be noted that this is for approximate circuit model of downhole tool 102 in FIG. 4, which may not contain any noise and other nonlinearities. It may illustrate the application and accuracy of workflow 800 (e.g., Referring to FIG. 8). Additionally, Z90 processing results obtained using these inverted angles may be illustrated in FIG. 10. These results may be close to the ideal case of FIG. 6.

FIGS. 11A, 11B, and 11C illustrate the resistivity images in logarithmic scale obtained synthetically using 3-dimensional electromagnetics modeling software without any processing. The modeling software may simulate the actual measurements made by downhole tool 102 (e.g., Referring to FIG. 1) to a much greater accuracy than the circuit model previously discusses (e.g., Referring to FIG. 4). Individual variations of the impedances measured by each electrode 304 (e.g., Referring to FIG. 3) of button array 128 (e.g., Referring to FIG. 3) as well as the variations of pads 134 (e.g., Referring to FIG. 3) may be simulated as well. The tool may have 8 pads with 24 buttons each. True resistivity values in this case may correspond to layers with 30° dip and low resistivities up to a depth of 15.3 inches and then higher resistivity layers above 15.3 inches (for the button with azimuth angle of 180° as reference.) Resistivity of layers in the formation may be shown in Table 4.

TABLE 4

| True Resistivity Values | |
|---|---|
| Resistivity (Ohm) | Upper bound (inch) |
| 1000 | ~∞ |
| 100 | 21.1 |
| 10000 | 16.5 |
| 6 | 15.3 |
| 3 | 14.2 |
| 10 | 13.0 |
| 0.6 | 12.4 |

TABLE 4-continued

| True Resistivity Values | |
|---|---|
| Resistivity (Ohm) | Upper bound (inch) |
| 0.1 | 11.3 |
| 0.3 | 10.1 |
| 2 | 9.5 |
| 1 | 4.9 |

Grayscale may be based on the apparent resistivity obtained by dividing the impedances measured at the buttons by an appropriate tool constant. The differentiating scale for grayscale images is on the right of each figure. Pixels where there is no data (i.e. not covered by pads) is shown in white color in these images and they occur as vertical stripes. Note that pixels with high resistivity are also shown in white but such an overlap may be unavoidable while presenting such an image in gray scale. It can be seen that low frequency case is especially insensitive to the low resistivity layers due to the mud effect.

FIGS. 12A, 12B, and 12C illustrate the results with mud effective removal, wherein the error in mud angle may be about 1°. In addition to the pixels with no data, pixels with negative data may also be represented by the color white in these images since the image may be in log scale. It may be seen that, with the wrong mud angles, results deteriorated from the original data rather than improving the images and removing the mud effect. This may be obvious at the low frequency image. High frequency image may be relatively unaffected in the low resistivity region (ignoring the dielectric roll-off at the high resistivity layer above 21.1" since this layer may not be a layer where mud effect removal is expected to work.)

FIGS. 13A, 13B, and 13C illustrate the results of a mud effect removal algorithm after the mud angle optimization method may be applied. It may be seen that results improved, compared to the case in FIGS. 12A, 12B, and 12C where wrong mud angles were used. Compared to the original data in FIGS. 11A, 11B, and 11C improvement may be seen in low resistivity regions which are resolved much better especially for the low frequency image. Resistivity values after processing may be much closer to the true values and contrast of the image may be improved.

In an example, the selection process as described in here may be used to produce a quality indicator of the mud angle selection algorithm. For example, this determination may be based on the resistivity data obtained through other tools or the data obtained from the imager tool. If the expected formation resistivities are high, this may indicate a region where mud angle optimization may not work well (and is not needed as well.) Another quality indicator may be based on the noise levels of the measured data. For example, for measurements made in the same location or in close proximity, change in the measured signal may be used to determine noise levels. Noisy channels/or sections may be removed from the data set in some implementations.

For the third step 806 of workflow 800 (e.g., Referring to FIG. 8), as discussed previously a correlation based approach may be used. Correlation of two random variables X and Y may be defined as:

$$\frac{E[(X - \mu_X)(Y - \mu_Y)]}{\sigma_X \sigma_Y} \quad (7)$$

In Equation (7), µ denotes the mean while σ denotes the standard deviation of the random variable. Expansion of the correlation concept to multiple variables as well as other measures of dependence between random variables may be used. Mud angles that maximize the correlation between data coming from different frequencies may be returned to an operator in step 808 (e.g., Referring to FIG. 8) as the result in this case. Again, an inversion scheme may be applied to determine these mud angles, as discussed above.

Discussed above are methods and systems for improving current technology. Specifically, improving the quality of electrical images that may be used to determine formation properties. Current problems faced by imaging tools reduce and degrade electrical images. Poor quality electrical images make drilling operations and/or production operations difficult. Operators may make improper decisions based off low quality images. This may extend drilling time, increase costs, reduce production, and/or negatively effect a well. There is a need to produce high quality electrical images that are reliable.

In oil based mud, oil based mud imagers exhibit a strong mud effect at low formation resistivities, which may be more pronounced if the selected operating frequency is relatively low. Current techniques to remove a strong mud effect utilize a computed mud angle. Thus, accurate determination of the mud angle is key to effectiveness of mud removal methods. Mud effect removal algorithms are highly dependent on the accuracy of the found mud angle. Even a few errors of a few tenths of a degree may lead to serious degradation in electrical image quality. As disclosed above, a method for improving the determination of a mud angle from the imaging data will improve the electrical images. Specifically, the methods and system may eliminate effects that cause inaccuracies in the imaging data, such as noise. Increasing sharpness and contract of the electrical images.

In examples, the method and systems may use multi-frequency logging data. Once a mud removal technique is applied and formation resistivity is low, results at different frequencies may match if the mud angle selection is correct. Therefore, mud angles that minimize the difference between different frequencies (or maximize correlation between frequencies) may be found. Disclosed methods and systems separate themselves from current technology by using multi-frequency data to improve determination of mud angles. In addition, the methods may find mud angles that minimize differences between multi-frequency data after processing and may employ correlation of multi-frequency data to determine optimal mud angles. Furthermore, methods may use data from higher frequencies that may have minimal mud effect in addition to processed data for optimization any may use imaging data for finding the optimal mud angles without special mud angle measurements. Systems may also find a suitable range of data from the image log for performing mud optimization methods. Increasing the quality of the images improves the interpretation of data, which is sued to determine petrophysical answer products such as formation lithology, sedimentology, and location and size of fractures.

Statement 1: A method for estimating a mud angle may comprise disposing a downhole tool into a borehole; energizing a button array, wherein the button array comprise at least one electrode; transmitting a current from the electrode into a formation; recording the current from the formation with a return electrode to obtain a plurality of measurements; identifying at least one low resistivity zone from the plurality of measurements to produce a measurement set; inverting the measurement set to find a mud angle vector; removing the mud angle vector from the measurement set to obtain a corrected measurement; and obtaining an electrical image using the corrected measurement.

Statement 2: The method of statement 1, further comprising inverting the measurement set with an iterative inversion scheme.

Statement 3: The method of any previous statement, wherein the iterative inversion scheme further comprises calculating a cost function with the measurement set and performing a convergence test.

Statement 4: The method of statement 3, wherein the cost function is $$\left\| \begin{array}{c} (\overline{\overline{z_{c}}}^{2} - \overline{\overline{z_{c}}}^{1})/\overline{\overline{z_{c}}}^{1} \\ \vdots \\ (\overline{\overline{z_{c}}}^{x} - \overline{\overline{z_{c}}}^{1})/\overline{\overline{z_{c}}}^{1} \\ \vdots \\ (\overline{\overline{z_{c}}}^{N} - \overline{\overline{z_{c}}}^{N-1})/\overline{\overline{z_{c}}}^{N-1} \end{array} \right\|.$$

Statement 5: The method of statement 3, wherein the cost function is $$\left\| \begin{array}{c} (\overline{\overline{z_{c}}}^{2} - \overline{\overline{z_{c}}}^{1})/\overline{\overline{z_{c}}}^{1} \\ \vdots \\ (\overline{\overline{z_{c}}}^{x} - \overline{\overline{z_{c}}}^{1})/\overline{\overline{z_{c}}}^{1} \\ \vdots \\ (\overline{\overline{z_{c}}}^{N} - \overline{\overline{z_{c}}}^{N-1})/\overline{\overline{z_{c}}}^{N-1} \\ (\overline{I}^{N} - \overline{\overline{z_{c}}}^{1})/\overline{\overline{z_{c}}}^{1} \\ (\overline{I}^{N} - \overline{\overline{z_{c}}}^{n})/\overline{\overline{z_{c}}}^{n} \end{array} \right\|.$$

Statement 6: The method of statement 3-statement 5, wherein if a condition is met in the convergence test the mud angle is found.

Statement 7. The method of statement 1, further comprising inverting the measurement set by finding the mud angle vector that maximizes a correlation of measurements from the measurement set at different frequencies after removing the mud angle vector from the measurement set.

Statement 8. The method of statement 7, further comprising correcting the mud angle vector for a temperature variation with depth using an assumed mud angle gradient.

Statement 9. The method of statement 7 or statement 8, further comprising determining the mud angle vector for a plurality of depths to determine a variation of the mud angle vector with depth.

Statement 10. The method of statement 7-statement 9, wherein removing the mud angle vector comprises Z90 processing.

Statement 11: A system for determining a formation boundary, comprising: a downhole tool, wherein the downhole tool comprises: at least one electrode; and at least one return electrode; a conveyance, wherein the conveyance is connected to the downhole tool; and an information handling system, wherein the information handling system is configured to identify at least one low resistivity zone from a plurality of measurements to produce a measurement set, invert the measurement set to find a mud angle vector; apply a mud effect removal scheme to the mud angle vector to obtain a corrected measurement, and obtain an electrical image using the corrected measurement.

Statement 12: The system of statement 11, wherein the information handling system is further configured to invert the measurement set with an iterative inversion scheme.

Statement 13: The system of statement 11 or statement 12, wherein the information handling system is further configured to calculate a cost function with the measurement and perform a convergence test.

Statement 14: The system of statement 11-statement 13, wherein the cost function is $$\left\| \begin{array}{c} (\overline{Z_c^2} - \overline{Z_{c,1}^1})/\overline{Z_c^1} \\ \vdots \\ (|\overline{Z_c^N} - \overline{Z_{c,1}^1}|/\overline{Z_c^1}) \\ \vdots \\ (\overline{Z_c^N} - \overline{Z_c^{N-1}})/\overline{Z_c^{N-1}} \end{array} \right\|.$$

Statement 15. The system of statement 11-statement 14, wherein the cost function is $$\left\| \begin{array}{c} (\overline{Z_c^2} - \overline{Z_{c,1}^1})/\overline{Z_c^1} \\ \vdots \\ (\overline{Z_c^N} - \overline{Z_{c,1}^1})/\overline{Z_c^1} \\ \vdots \\ (\overline{Z_c^N} - \overline{Z_c^{N-1}})/\overline{Z_c^{N-1}} \\ (\overline{I}^N - \overline{Z_{c,1}^1})/\overline{Z_c^1} \\ (\overline{I}^N - \overline{Z_c^*})/\overline{Z_c^*} \end{array} \right\|.$$

Statement 16. The system of statement 11-statement 15, wherein the information handling system is further configured to correct the mud angle vector for a temperature variation with depth using an assumed mud angle gradient.

Statement 17. The system of statement 16, wherein the information handling system is further configured to determine the mud angle vector for a plurality of depths to determine a variation of the mud angle vector with depth.

Statement 18. The system of statement 16 or statement 17, wherein the information handling system is further configured to invert the measurement set by finding the mud angle vector that maximizes a correlation of the plurality of measurements at different frequencies.

Statement 19. The system of statement 16-statement 18, wherein the mud effect removal scheme comprises Z90 processing.

Statement 20. The system statement 16-statement 19, wherein the information handling system is further configured to determine at least one low resistivity zone from a histogram of impedances from the electrical image.

Although the present invention and its advantages have been described in detail, it should be understood that various changes, substitutions and alterations may be made herein without departing from the spirit and scope of the invention as defined by the appended claims. The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for estimating a mud angle, comprising:
   disposing a downhole tool into a borehole;
   energizing a button array, wherein the button array comprises at least one electrode;
   transmitting a current from the electrode into a formation;
   recording the current from the formation with a return electrode to obtain a plurality of measurements;
   identifying at least one low resistivity zone from the plurality of measurements;
   producing a measurement set from the at least one low resistivity zone;
   identifying a mud effect in the at least one low resistivity zone;
   inverting the measurement set to find a mud angle vector wherein the mud angle vector minimizes the difference between the responses at the plurality of frequencies and is based at least in part on the mud effect in the at least one low resistivity zone;

removing the mud angle vector from the plurality of measurements to obtain a plurality of corrected measurements; and obtaining an electrical image using the plurality of corrected measurements.

2. The method of claim 1, further comprising inverting the measurement set with an iterative inversion scheme.

3. The method of claim 2, wherein the iterative inversion scheme further comprises calculating a cost function with the measurement set and performing a convergence test.

4. The method of claim 3, wherein the cost function is:

$$\left\| \begin{array}{c} (\overline{R_c}^2 - \overline{R_c^1})/\overline{R_c^1} \\ \vdots \\ (|\overline{R_c}^x - \overline{R_c^1}|)/\overline{R_c^1} \\ \vdots \\ (\overline{R_c}^N - \overline{R_c}^{N-1})/\overline{R_c}^{N-1} \end{array} \right\|.$$

wherein Rc is the real part of the corrected impedance and N is the total number of frequencies.

5. The method of claim 3, wherein the cost function is:

$$\left\| \begin{array}{c} (\overline{R_c}^2 - \overline{R_c^1})/\overline{R_c^1} \\ \vdots \\ (\overline{R_c}^x - \overline{R_c^1})/\overline{R_c^1} \\ \vdots \\ (\overline{R_c}^N - \overline{R_c}^{N-1})/\overline{R_c}^{N-1} \\ (\overline{I}^N - \overline{R_c^1})/\overline{R_c^1} \\ (\overline{I}^N - \overline{R_c}^x)/\overline{R_c}^x \end{array} \right\|.$$

wherein Rc is the real part of the corrected impedance, I is measured current and N is the total number of frequencies.

6. The method of claim 3, wherein if a condition is met in the convergence test the mud angle is found.

7. The method of claim 1, further comprising inverting the measurement set by finding the mud angle vector that maximizes a correlation of measurements from the measurement set at different frequencies after removing the mud angle vector from the measurement set.

8. The method of claim 1, further comprising correcting the mud angle vector for a temperature variation with depth using an assumed mud angle gradient.

9. The method of claim 1, further comprising determining the mud angle vector for a plurality of depths to determine a variation of the mud angle vector with depth.

10. A system for determining a formation boundary, comprising:

a downhole tool, wherein the downhole tool comprises:
at least one electrode; and
at least one return electrode;

a conveyance, wherein the conveyance is connected to the downhole tool; and an information handling system, wherein the information handling system is configured to:
identify at least one low resistivity zone from a plurality of measurements;
produce a measurement set from the at least one low resistivity zone;
identify a mud effect in the at least one low resistivity zone;
invert the measurement set to find a mud angle vector wherein the mud angle vector minimizes the difference between the responses at the plurality of frequencies and is based at least in part on the mud effect in the at least one low resistivity zone;
remove the mud angle vector from the plurality of measurements to obtain a plurality of corrected measurements; and
obtain an electrical image using the plurality of corrected measurements.

11. The system of claim 10, wherein the information handling system is further configured to invert the measurement set with an iterative inversion scheme.

12. The system of claim 11, wherein the information handling system is further configured to calculate a cost function with the measurement and perform a convergence test.

13. The system of claim 12, wherein the cost function is:

$$\left\| \begin{array}{c} (\overline{R_c}^2 - \overline{R_c^1})/\overline{R_c^1} \\ \vdots \\ (|\overline{R_c}^x - \overline{R_c^1})/\overline{R_c^1} \\ \vdots \\ (\overline{R_c}^N - \overline{R_c}^{N-1})/\overline{R_c}^{N-1} \end{array} \right\|.$$

wherein Rc is the real part of the corrected impedance and N is the total number of frequencies.

14. The system of claim 12, wherein the cost function is:

$$\left\| \begin{array}{c} (\overline{R_c}^2 - \overline{R_c^1})/\overline{R_c^1} \\ \vdots \\ \overline{R_c}^x - \overline{R_c^1}/\overline{R_c^1} \\ \vdots \\ (\overline{R_c}^N - \overline{R_c}^{N-1})/\overline{R_c}^{N-1} \\ (\overline{I}^N - \overline{R_c^1})/\overline{R_c^1} \\ (\overline{I}^N - \overline{R_c}^x)/\overline{R_c}^x \end{array} \right\|.$$

wherein Rc is the real part of the corrected impedance, I is measured current, and N is the total number of frequencies.

15. The system of claim 10, wherein the information handling system is further configured to correct the mud angle vector for a temperature variation with depth using an assumed mud angle gradient.

16. The system of claim 10, wherein the information handling system is further configured to determine the mud angle vector for a plurality of depths to determine a variation of the mud angle vector with depth.

17. The system of claim 10, wherein the information handling system is further configured to invert the measurement set by finding the mud angle vector that maximizes a correlation of the plurality of measurements at different frequencies.

18. The system of claim 10, wherein the information handling system is further configured to determine at least one low resistivity zone from a histogram of impedances from the electrical image.

* * * * *